(No Model.) 2 Sheets—Sheet 1.
H. A. WINTERNIGHT.
CAR COUPLING.
No. 441,624. Patented Nov. 25, 1890.
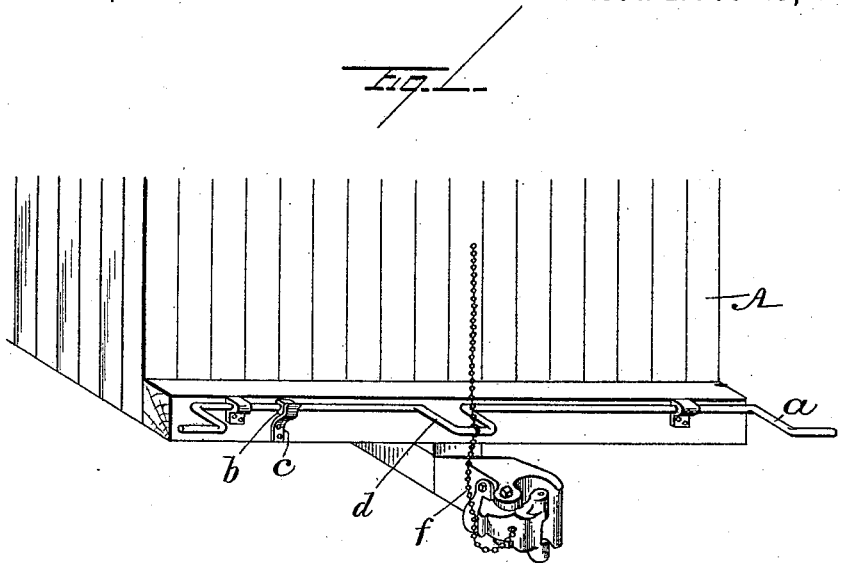
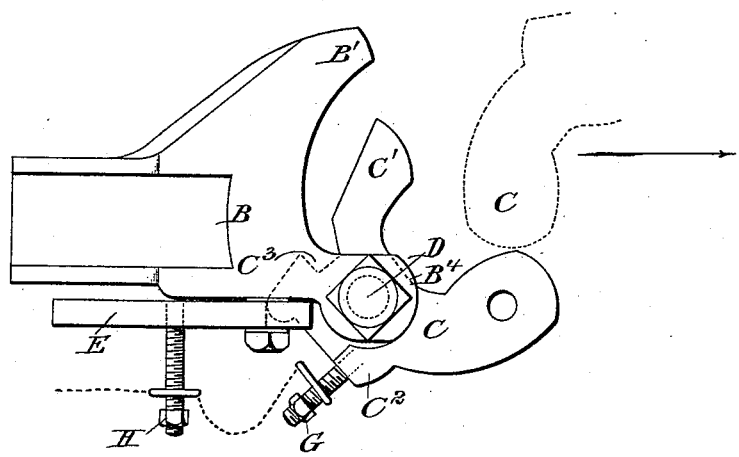
WITNESSES:
INVENTOR
ATTORNEY.

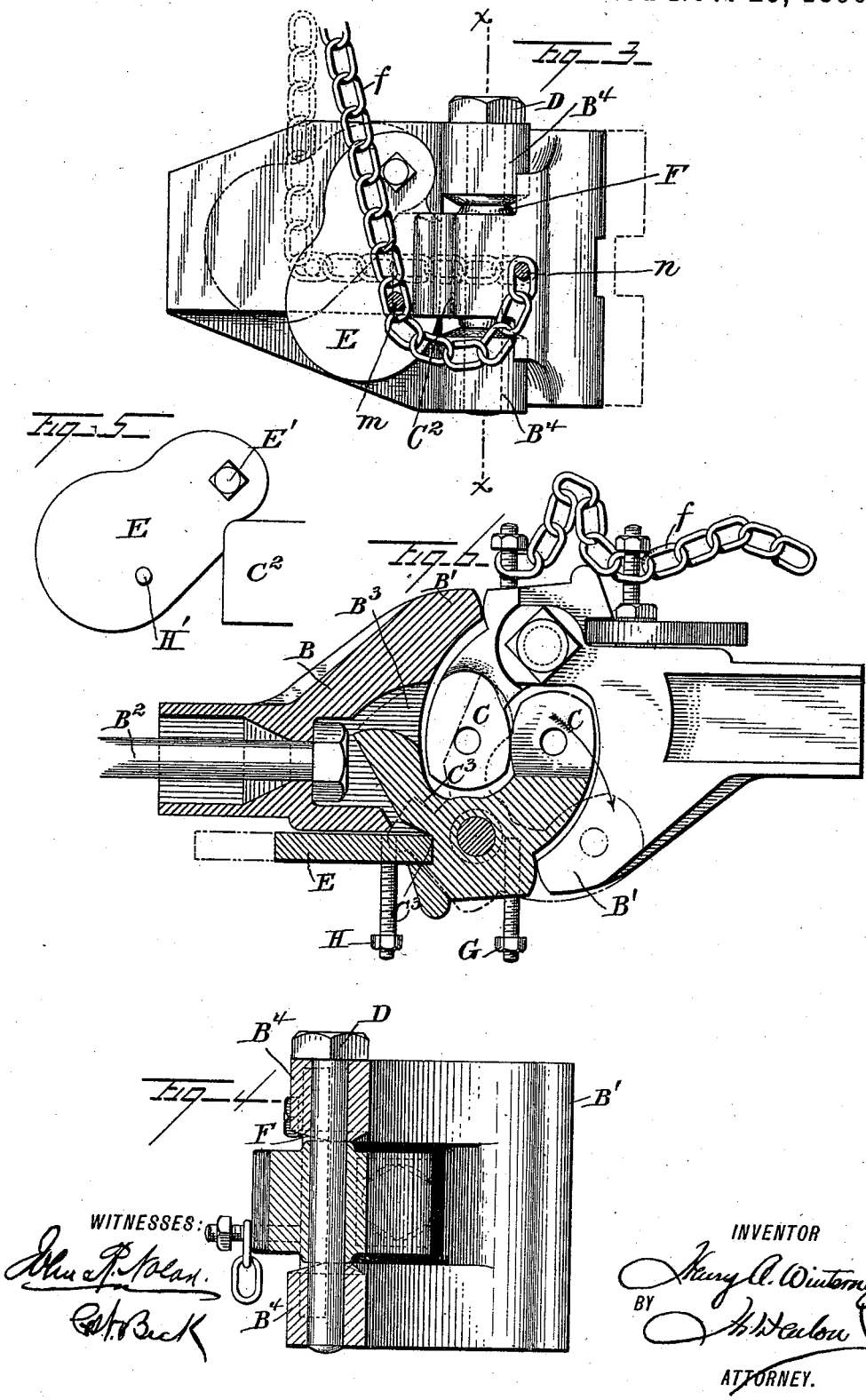

UNITED STATES PATENT OFFICE.

HENRY A. WINTERNIGHT, OF PHILADELPHIA, PENNSYLVANIA, ASSIGNOR OF ONE-HALF TO JAMES M. CORNYN, OF SAME PLACE.

CAR-COUPLING.

SPECIFICATION forming part of Letters Patent No. 441,624, dated November 25, 1890.

Application filed June 19, 1890. Serial No. 355,941. (No model.)

*To all whom it may concern:*

Be it known that I, HENRY A. WINTERNIGHT, a citizen of the United States, residing in the city of Philadelphia, State of Pennsylvania, have invented certain new and useful Improvements in Car-Couplers, of which the following is a full, clear, and exact description, reference being had to the accompanying drawings, forming a part of this specification.

My invention relates to car-coupling devices, and has for its object to render the same automatic in action both in coupling and uncoupling; and to that end it consists of the several mechanisms and combinations thereof hereinafter set forth.

In the accompanying drawings, illustrating my invention, Figure 1 is an elevation of the rear end of a car, showing the coupling device in position thereon. Fig. 2 is a top view in outline of the coupling device, showing, partly in dotted lines, the full form of the clutch or coupling-knuckle. Fig. 3 is a side elevation intended to show more particularly the side construction of the coupling-knuckle and its bearings in the supporting-head and the relative position thereto of the locking pin or latch. Fig. 4 is a sectional view thereof through the line $xx$ of Fig. 3. Fig. 5 is an outline view of the locking pin or latch resting upon the side piece of the coupling-knuckle. Fig. 6 is a side elevation and a sectional view, respectively, of two of my car-coupling devices in position with the cars coupled together thereby.

By reference to Fig. 6 it will be seen that the apparatus consists of the head-block B, provided with an extended buffer end B' and centrally recessed to admit of the insertion therein of a bolt $B^2$ or other means of attachment to the frame-work of the car and hollowed out in its central portion at $B^3$ to admit of the free play in said last-mentioned recess of the inner end of the pivoted clutch or knuckle-joint C. The curvature of the face of the head-block corresponds, generally, in shape with the curvature of the locking end of the coupling-knuckle—sufficiently so to prevent frictional contact between them in locking and unlocking the device. The head-block is provided on its other side with upper and lower arms $B^4$, furnishing a pivotal bearing between them for the clutch or knuckle C, the said arms and knuckle being recessed vertically and a pin D inserted therein. The knuckle C is thus pivoted at a point at or slightly within its center, and it is desirable that the knuckle should swing easily in its bearings and to some extent automatically, and to that end, as the hook C is to be the heaviest portion of the clutch or knuckle, I make the bearing therefor as shown in Fig. 3, so that the tendency of the knuckle shall be to swing outwardly, and this is accomplished by beveling the outward half of the face of the bearing—viz., by cutting away all that portion of the face thereof that is outwardly beyond the pivotal center shown by the vertical dotted line on the link-pin. (See Fig. 4, which is a section through the line $xx$ of Fig. 3.) Both the upper and lower arms $B^4$ of the head-block have the outward half of the face of their bearing-surfaces thus beveled, which necessarily brings the beveled surfaces opposite each other and the slant of the bevels of the two arms in opposite directions to each other. The upper and lower bearing-surfaces of the knuckle C may be either flat or provided with an ordinary bevel, preferably the latter, so that the actual bearing-surface, which is wholly inside of the pivotal center, will be reduced to a minimum, as shown at F in Figs. 3 and 4. The knuckle C therefore swings readily in an arc of a circle in the bearings $B^4$, and its shape is as shown in Fig. 6, but more clearly in outline in Fig. 2, it being provided with the clutch end C. (Shown in normal position in Fig. 2 and in its locked position in Fig. 6.)

Referring to Fig. 2 it will be seen that the knuckle is provided on its inner side with an extended piece C', whereby the coupler is locked when this part is brought in contact with the clutch end C of the next car. The body portion is recessed at $C^3$, so that the pivoted latch E may fall in said recess and lock the knuckle in position when the parts are brought together, as shown in Fig. 6, and has also a side extension or projection $C^2$, hereinafter mentioned. The latch E may be of any ordinary shape, and is pivoted at its upper end at E' and slightly cut away to rest upon the projection $C^2$ of the coupling-knuckle (see Figs. 5 and 3) when the said latch E is not resting in the recess $C^3$ of the coupling-knuckle—that is to say, when the coupler is open, as shown on the outline, Fig. 2.

Secured to the outside of the coupling device is a pin G, screwed into the side $C^2$ of the knuckle, and a pin H, screwed into the latch E at $H'$, and to these two pins G and H is attached a chain $f$ or other connection, which has sufficient play between the two, so that when the latch is thereby raised to open the coupler the end $C^2$ will swing inwardly beneath the latch. The chain, when operated sufficiently to raise the latch out of the recess $C^3$, unlocks the device without moving the knuckle. If the cars are coupled together, the movement of them apart simultaneously throws back the knuckle its full limit. If cars are not coupled, but apart, the chain can be lifted its full play, throwing the knuckle fully around or "setting" the device, so that in this position two cars coming together will simultaneously and automatically be coupled. The chain is extended from the pin H to the side of the car, and intermediately secured to a crank-bar $a$, having bearings in the rear end of the car, and being provided with a cam projection $b$, bearing against a spring $c$, the object being to hold the chain up and keep the latch raised, whereby the coupler is "set," as hereinafter mentioned, until the cars are coupled.

The operation of the device is as follows: The latch E, being moved by means of the chain, releases the knuckle C, which swings outwardly into position shown in Fig. 2. This is technically known as "setting" the coupler. The cars coming together, the end C of the knuckle of one coupler is brought in contact with the inner end $C'$ of the other knuckle, the effect being to swing the two together into the position shown in Fig. 6. Upon being swung around the recess $C^3$ of the knuckle C is brought beneath the end of the latch E, which thus falls into the recess and locks the device, and this action is automatic. The device can only be unlocked by raising the chain $f$ and its attached latch E, and this upon one or both of the cars at the same time, though the lifting of the latch upon one car only is all that is necessary.

My invention has advantages over other devices of similar character by reason of the fact that the impact of the parts coming together is not alone upon the end $C'$ of the knuckle, but simultaneously upon the part $B'$ of the head-block, and hence there is less liability of breaking off the end C of the knuckle—a fault very common in couplers of this general construction.

Having thus described my invention, what I claim as new, and desire to secure by Letters Patent, is—

1. In a car-coupling device, the combination, with a head-block provided with upper and lower bearings $B^4$, the opposite faces of which outwardly beyond the pivotal center are beveled in opposite directions to each other, of a coupling-knuckle partially rotated on a pin secured within said bearings, in order that the tendency of the knuckle should be to automatically swing outwardly on its bearings, substantially as described.

2. In a car-coupling device, the combination, with a head-block provided with bearings in which a pivoted coupling-knuckle is partially rotated, of a pivoted knuckle C, provided with a recess $C^3$ on its inner side, and also a side extension $C^2$, and a latch E, pivoted at its upper end to said head-block, said several parts being constructed, combined, and arranged in such manner that the latch will rest upon the side extension $C^2$ when the coupler is open or set, and will fall into the recess $C^3$ when the coupler is closed, thereby locking the same, substantially as described.

3. In an automatic and self-adjusting car-coupler, the combination, with a head-block and rotating knuckle C, constructed as described, with side extension $C^2$ and recess $C^3$, of a pivoted latch E and connecting mechanism between the knuckle and latch and between the car-body and the latch, which operates first to raise said latch to unlock and set the device, and then to be capable of further movement to rotate the said knuckle to its full limit, substantially as described.

In testimony whereof I have hereunto affixed my signature this 11th day of June, A. D. 1890.

HENRY A. WINTERNIGHT.

Witnesses:
JAS. M. CORNYN,
C. W. BECK.